(12) United States Patent
Purcell et al.

(10) Patent No.: US 9,836,104 B2
(45) Date of Patent: Dec. 5, 2017

(54) POWER SEQUENCING BY SLAVE POWER SEQUENCERS SHARING A COMMAND BUS

(71) Applicant: Hewlett-Packard Development Company, L.P., Houston, TX (US)

(72) Inventors: Brian T Purcell, Tomball, TX (US); Barry S Basile, Houston, TX (US); Binh Nguyen, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 195 days.

(21) Appl. No.: 14/763,582

(22) PCT Filed: Jan. 30, 2013

(86) PCT No.: PCT/US2013/023896
§ 371 (c)(1),
(2) Date: Jul. 27, 2015

(87) PCT Pub. No.: WO2014/120159
PCT Pub. Date: Aug. 7, 2014

(65) Prior Publication Data
US 2015/0370296 A1 Dec. 24, 2015

(51) Int. Cl.
*G06F 11/00* (2006.01)
*G06F 1/26* (2006.01)
(Continued)

(52) U.S. Cl.
CPC ............... *G06F 1/26* (2013.01); *G06F 1/12* (2013.01); *G06F 1/24* (2013.01); *G06F 11/221* (2013.01);
(Continued)

(58) Field of Classification Search
CPC ...... G06F 1/12; G06F 1/24; G06F 1/16; G06F 1/26–1/3296; G06F 11/0757
See application file for complete search history.

(56) References Cited

U.S. PATENT DOCUMENTS 5,563,455 A 10/1996 Cheng
6,212,645 B1 4/2001 Tjandrasuwita
(Continued)

FOREIGN PATENT DOCUMENTS

CN 1436328 A 8/2003
EP 1290537 10/2004

OTHER PUBLICATIONS

David Daniels, "Sequencing Power Supplies in Multiple Voltage Rail Environments," 2005, 32 pps., < http://www.ti.com/lit/ml/slup228/slup228.pdf >.
(Continued)

*Primary Examiner* — Michael Maskulinski
(74) *Attorney, Agent, or Firm* — Hewlett Packard Enterprise Patent Department (57) ABSTRACT

Embodiments provide apparatuses and systems in which slave power sequencers share a command bus and power sequence respective power groups through power sequence states of a power sequencing protocol in response to commands on the command bus. In some examples, a system may include a master power sequencer to output onto a command bus a command to perform a power sequencing protocol for transitioning the system from a first power state to a second power state, and a plurality of slave power sequencers sharing the command bus, each slave power sequencer to power sequence a respective power group to a next power sequence state in response to the command. Other examples are described and claimed.

20 Claims, 10 Drawing Sheets

(51) Int. Cl.
    *G06F 1/24*         (2006.01)
    *G06F 1/12*         (2006.01)
    *G06F 11/22*       (2006.01)
    *G06F 11/30*       (2006.01)

(52) U.S. Cl.
    CPC ...... *G06F 11/3027* (2013.01); *G06F 11/2221* (2013.01)

(56) References Cited

U.S. PATENT DOCUMENTS

| | | | |
|---|---|---|---|
| 6,766,222 B1 * | 7/2004 | Duley | G06F 1/26 307/41 |
| 7,111,183 B1 | 9/2006 | Klein | |
| 7,725,742 B2 | 5/2010 | Hirai | |
| 2009/0210735 A1 | 8/2009 | Brown | |
| 2011/0145604 A1 | 6/2011 | Maciorowski | |
| 2012/0153992 A1 | 6/2012 | Nogawa | |
| 2012/0290856 A1 | 11/2012 | Hirano | |

OTHER PUBLICATIONS

PCT/ISA/KR, International Search Report, dated Oct. 31, 2013, PCT/US2013/023896, 14 pps.

\* cited by examiner

POWER SEQUENCING BY SLAVE POWER SEQUENCERS SHARING A COMMAND BUS

BACKGROUND

Electronic systems commonly include sequencing circuitry for ensuring that the system's voltage rails maintain the proper timing and voltage inter-relationships during all operating conditions. In these systems, a master power sequencer is responsible for facilitating performance of a power sequencing protocol by slave power sequencers for transitioning the system from one power state to another. For performing the power sequencing protocol, the master power sequencer, having full knowledge of the number of slave power sequencers and the number of power groups controlled by each of the slave power sequencers, issues specific commands directly to each of the individual slave power sequencers to transition to particular power sequence states of the power sequencing protocol.

BRIEF DESCRIPTION OF THE DRAWINGS

Embodiments of the present disclosure will be described by way of example embodiments, but not limitations, illustrated in the accompanying drawings in which like references denote similar elements, and in which.

DETAILED DESCRIPTION OF EMBODIMENTS

Embodiments of the present disclosure provide slave power sequencers that share a command bus and power sequence respective power groups through power sequence states of a power sequencing protocol in response to commands on the command bus, master power sequencers to issue commands to such slave power sequencers to perform the power sequencing protocol, and systems including such slave and master power sequencers. Other embodiments are described and claimed.

Various aspects of the illustrative embodiments are described using terms commonly employed by those skilled in the art to convey the substance of their work to others skilled in the art. It will be apparent to those skilled in the art that alternate embodiments may be practiced with only some of the described aspects. For purposes of explanation, specific numbers, materials, and configurations are set forth in order to provide a thorough understanding of the illustrative embodiments. It will be apparent to one skilled in the art that alternate embodiments may be practiced without the specific details. In other instances, well-known features are omitted or simplified in order not to obscure the illustrative embodiments.

The phrases 'in various embodiments," "in various examples," "in some embodiments," and "in some examples" are used repeatedly. The phrases generally do not refer to the same embodiments; however, they may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Power sequencing circuitry of a system may include a master power sequencer and a plurality of slave power sequencers, each slave power sequencer controlling a plurality of power groups for ensuring that the system's voltage rails maintain the proper timing and voltage inter-relationships during all operating conditions (e.g., power up, power down, fault, etc.). A power sequencing protocol may include power sequencing states that direct the timing of enabling or disabling of the power groups by the individual slave power sequencers.

In architectures in which the master power sequencer issues commands separately to each slave power sequencer for transitioning through a power sequencing protocol, the master power sequencer generally must have full knowledge of the number of slave power sequencers and the number of power groups controlled by each of the slave power sequencers. To perform the power sequencing protocol, the master power sequencer issues separate commands to the separate power sequencers to enable/disable specific power groups controlled by the slave power sequencer. This sort of scheme commonly requires high look-up table (LUT) utilization. In this case, the master power sequencer has to know how many slave power groups there are, and therefore, the code generally must be tailored to each unique platform.

Architectures in which the master power sequencer issues power-sequence-state-specific commands for transitioning through a power sequencing protocol may also result in high signal/pin overhead for transmitting state information to each slave power sequencer, particularly for those implementations including one bus per slave. In some instances, there may be upwards of six or more pins to each slave power sequencer.

Described herein are various embodiments of a scalable power sequencing architecture including a hardened master power sequencer whose master-slave power sequencing protocol abstracts the master power sequencer from implementations of the underlying power sequencing architecture. Various embodiments of slave power sequencers that share a command bus and power sequence respective power groups through power sequence states of a power sequencing protocol in response to commands on the command bus, agnostic master power sequencers to issue commands to such slave power sequencers to perform the power sequencing protocol, and systems including such slave and master power sequencers. Other embodiments are described and claimed.

Figure 1:
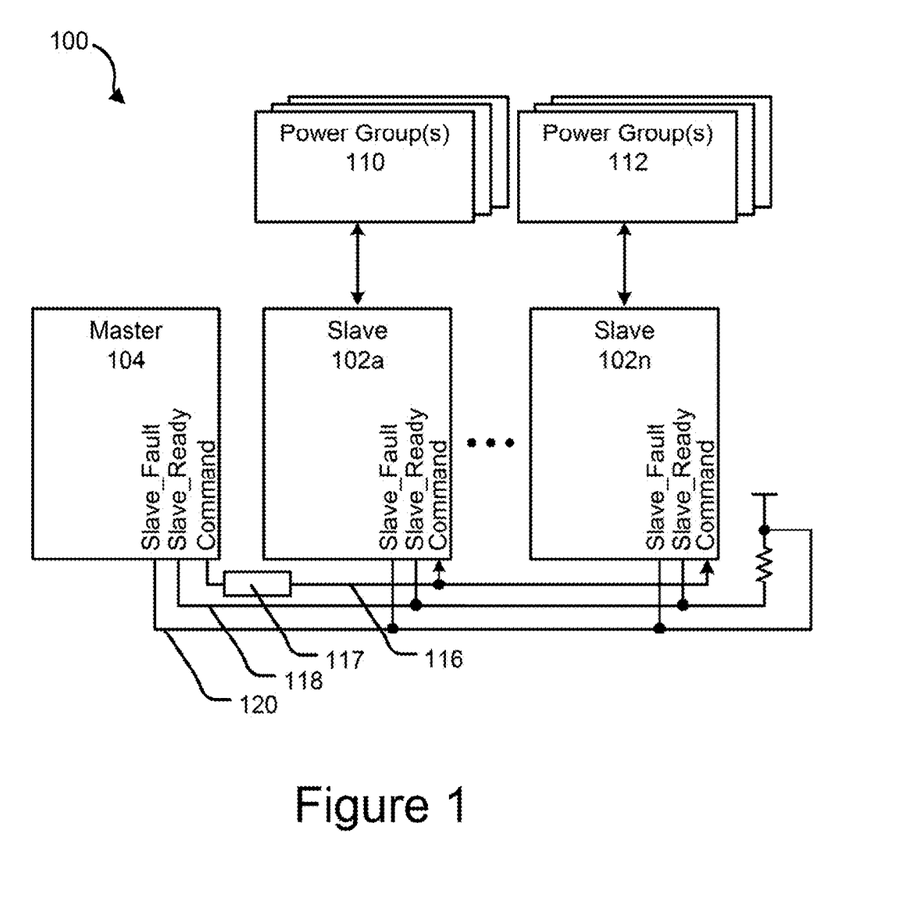
FIG. 1 is a block diagram of an example power sequencing system, in accordance with various embodiments.

FIG. 1 illustrates a system 100 having a scalable power sequencing architecture including slave power sequencers 102a . . . 102n (wherein n=number of slave power sequencers) and a hardened master power sequencer 104 whose master-slave power sequencing protocol abstracts the master power sequencer 104 from implementations of the underlying power sequencing architecture. It is noted that although FIG. 1 illustrates the system 100 as having more than one slave power sequencer 102a . . . 102n, in other examples, a system within the scope of this disclosure may include just one slave power sequencer.

In various examples, the system 100 comprises any computing system having multiple voltage sources or supplies to power different portions of the system. A server, for example, may utilize a chassis that houses many computing blades. Each computing blade may have multiple instances of subsystems such as, for example, an agent subsystem, a central processing unit subsystem, a memory subsystem, an I/O subsystem, or a cache subsystem. Various components of the subsystems, and across subsystems, may be powered up or down in power groups 110, 112, by voltage regulator modules (not illustrated here), for ensuring that the system's voltage rails maintain the proper timing and voltage inter-relationships during all operating conditions (e.g., power up, power down, fault, etc.).

The slave power sequencers 102a . . . 102n may power sequence at least one power group 110, 112, in accordance with a power sequencing protocol, for ensuring that the voltage rails of the system 100 maintain the proper timing and voltage inter-relationships during all operating conditions (e.g., power up, power down, fault, etc.). In various examples, a power group of power groups 110, 112 may comprise at least one subsystem of the system 100 and may include at least one voltage regulator module (not illustrated here) for enabling/disabling the at least one subsystem. The power groups 110, 112 may provide fine-level power sequencing of the voltage regulator modules, in accordance with the power sequencing protocol, as described more fully herein.

The master power sequencer 104 may be communicatively coupled with the slave power sequencers 102a . . . 102n by command bus 116, status bus 118, and fault bus 120. As illustrated, the slave power sequencers 102a . . . 102n share the command bus 116, the status bus 118, and the fault bus 120. In various examples, the command bus 116 may include a buffer 117 for buffering command signals.

The master power sequencer 104 may output onto the command bus 116 a command to perform a power sequencing protocol in accordance with the power request. For example, if the master power sequencer 104 receives a power request to power up the system 100 from a first power state to a second power state (such as, e.g., from an S5 (off/standby) power state to an S0 (running) power state), the master power sequencer 104 may output onto the command bus 116 a command to perform a power-up power sequencing protocol (e.g., an UP signal). Likewise, if the master power sequencer 104 receives a power request to power down the system 100 (such as, e.g., from the second power state to the first power state), the master power sequencer 104 may output onto the command bus 116 a command to perform a power-down power sequencing protocol (e.g., a DOWN signal).

The slave power sequencers 102a . . . 102n may power sequence a next one of the power groups 110, 112 to a next power sequence state in response to commands on the command bus 116 to perform the power sequencing protocol. In various examples, a power sequencing protocol may direct the order of enabling or disabling the individual power groups, and the power sequencing states of a power sequencing protocol may direct which power groups is enabled or disabled next. A command on the command bus may be an indication, therefore, to enable/disable the next power group (i.e., transition to the next power sequence state) in accordance with the protocol.

After power sequencing the next one of the power groups 110, 112 to the next power sequence state, the slave power sequencers 102a . . . 102n may output onto the status bus 118 an indication of completion of the power sequence state. The master power sequencer 104 may monitor the status bus 118 for an indication of the status of performance of the power sequencing protocol by the slave power sequencers 102a . . . 102n, and periodically repeat outputting the command for transitioning the system from the first state to the second state until the status bus 118 indicates that all of the slave power sequencers 102a . . . 102n have completed the power sequence state.

Figure 2:
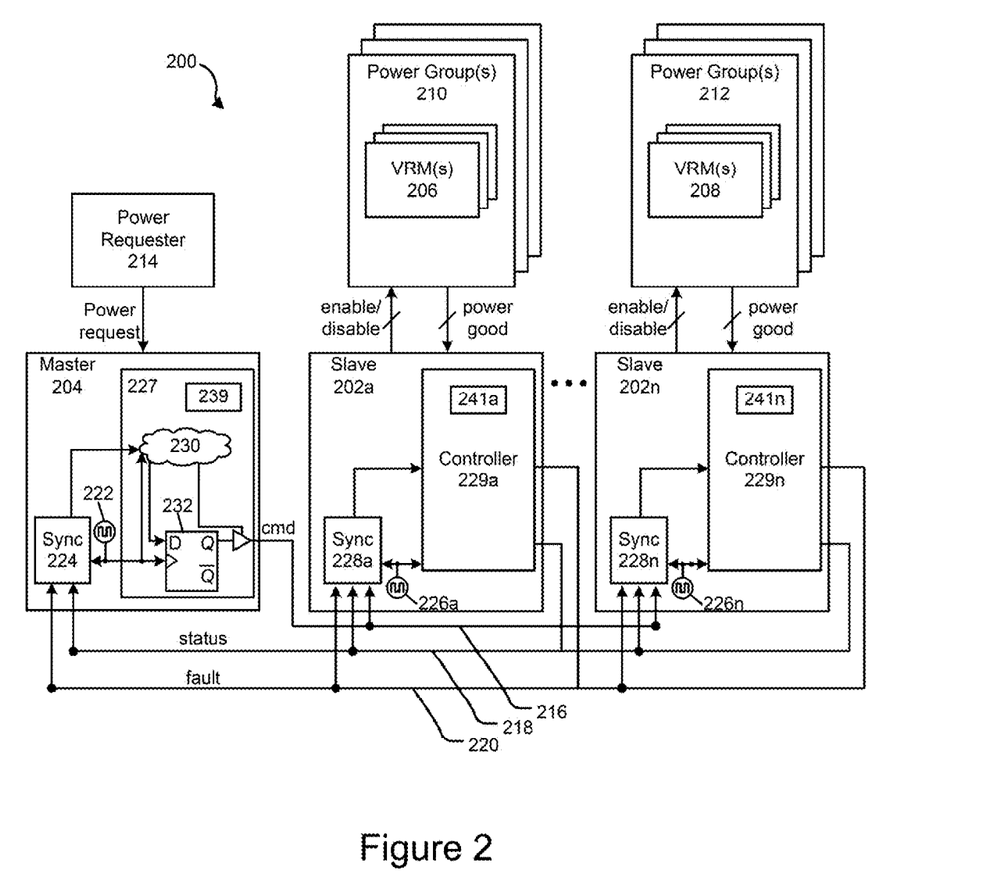
FIG. 2 is a block diagram of another example power sequencing system, in accordance with various embodiments.

FIG. 2 illustrates detailed views of another example system 200 including slave power sequencers 202a . . . 202n (wherein n=number of slave power sequencers) and a master power sequencer 204. The master power sequencer 204 and the slave power sequencers 202a . . . 202n may share a set of common command/status signals via command bus 216, status bus 218, and fault bus 220. It is noted that although FIG. 2 illustrates the system 200 as having more than one slave power sequencer 202a . . . 202n, in other examples, a system within the scope of this disclosure may include just one slave power sequencer.

As illustrated, the master power sequencer 204 includes a master clock 222 and the slave power sequencers 202a . . . 202n each include a slave clock 226a . . . 226n, wherein the master clock 222 and the slave clocks 226a . . . 226n are independent of each other (e.g., independent in phase and frequency). The master power sequencer 204 may include a master synchronizer 224 to synchronize incoming signals to the master clock 222. Similarly, the slave power sequencers 202a . . . 202n may each include a slave synchronizer 228a . . . 228n to synchronize incoming signals to the slave clock 226a . . . 226n. In an example, the synchronizers 224, 228a . . . 228n may maintain proper synchronization and communication between the master power sequencer 204 and the slave power sequencers 202a . . . 202n and to help prevent or reduce meta-stability as compared to a system without such synchronizers. In various examples, these independent clock domains may allow the system 200 to meet tighter timing margins versus systems with a common clock architecture. For example, timing margins for an architecture with a common clock architecture may be impacted by clock-to-data setup, printed circuit board (PCB) delay, clock-to-out, and clock skew and jitter timings.

In some examples, the master power sequencer 204 and at least one of the slave power sequencers 202a . . . 202n may share have a common clock domain in which a clock (or buffered clock) and synchronizer are shared with a fixed phase and frequency relationship (not illustrated). In some of these examples, the master power sequencer 204 and at least one of the slave power sequencers 202a . . . 202n may share a clock and synchronizer if the master power sequencer 204 and the at least one of the slave power sequencers 202a . . . 202n are located within the same complex programmable logic device.

The master power sequencer 104 may interface between a system power requester 214 and the slave power sequencers 202a . . . 202n. On receiving a power request from a power requester 214, a controller 227 of the master power sequencer 204 may output onto the command bus 216 a command to perform a power sequencing protocol in accordance with the power request. In various examples, the controller 227 may include a state machine 230 to receive input signals from the status bus 218 and fault bus 220 via the synchronizer 224, and a flip-flop 232 to output commands to the command bus 216. The flip-flop 232 may include a clock input terminal coupled to the master clock 222, a data terminal coupled to an output of the state machine 230, and an output terminal coupled to the command bus 216. In various examples, the controller 227 may include a watchdog timer 239 set for a predetermined amount of time, which the master power sequencer 204 may start when outputting the command onto the command bus 216, as described more fully herein.

The slave power sequencers 202a . . . 202n may include a controller 229a . . . 229n to receive a command to perform the power sequencing protocol for transitioning the system 200 from the first power state to the second power state. In various examples, a power sequencing protocol may direct the order of enabling or disabling the individual power groups 210, 212, and the power sequencing states of a power sequencing protocol may direct which power group is enabled or disabled next. In other words, on receipt of a command, the slave may power sequence the power groups 210, 212 to a next power sequence state, and on receipt of subsequent commands, the slaves may continue to transition to next power sequence states until all power sequence states for the power sequencing protocol have been completed (or until a fault is encountered, as described more fully elsewhere). In various embodiments, the power groups 210, 212 may be enabled/disabled by sequentially enabling or disabling at least one of the local voltage regulator modules 206, 208 of the particular power groups 210, 212 in accordance with the power sequencing protocol.

After commanding a power group to enable/disable, the respective slave power sequencer 202a . . . 202n may wait for a "power good" signal from the specific power group 210, 212 indicating that the power group 210, 212 has been enabled/disabled. In some examples, the slave power sequencers 202a . . . 202n may include a watchdog timer 241a . . . 241n set for a predetermined amount of time, which the slave power sequencers 202a . . . 202n may start when commanding the power groups to enable/disable. When the "power good" signal is received, the slave power sequencers 202a . . . 202n may output to the status bus 118 a status indication of the power sequencing of the power group. In various examples, each of the slave power sequencers 202a . . . 202n may output the status indication that the power group has been enabled/disabled. In various examples, the slave power sequencers 202a . . . 202n may output a status indication prior to completion of the power sequencing protocol to indicate that at least one of the power groups or voltage regulator modules still remain to be enabled/disabled in accordance with the power sequencing protocol. In various ones of these examples, the status indication may be a ready/non-ready indication in response to a command on the command bus 216 from the master power sequencer 204 to power up or power down the next power group.

In various examples, the slave power sequencers 202a . . . 202n may output to the fault bus 220 an indication of a fault. A fault may occur, for example, during power-up in which at least one of the voltage regulator modules 206, 208 or power groups 210, 212 fail to power up during a power sequencing protocol, during runtime in which at least one of the voltage regulator modules 206, 208 or power groups 210, 212 fails or performs incorrectly, or an overcurrent or otherwise fatal event. In various examples, a fault may be a failure to perform a power sequence state within a predetermined time period (e.g., if powering up or down a power group takes longer than a predetermined time period). In some of these examples, the watchdog timer 241a . . . 214n may be set for the predetermined time period.

In various examples, the slave power sequencers 202a . . . 202n may determine whether a local fault (e.g., a fault local to the particular slave power sequencer 202a . . . 202n) is fatal or non-fatal and output onto the fault bus 220 an indication whether the local fault is fatal or non-fatal, as described more fully herein.

In various examples, the slave power sequencers 202a . . . 202n may power down other non-faulting power groups if any of the other one of its power groups 210, 212 or voltage regulator modules 206, 208 faults.

In various examples, the slave power sequencers 202a . . . 202n may monitor the fault bus 220 for a fault indication by any one of the slave power sequencers 202a . . . 202n. If the slave power sequencers 202a . . . 202n detect a fault indication on the fault bus 220, the slave power sequencers 202a . . . 202n may discontinue monitoring for local fault. In various ones of these examples, the slave power sequencers 202a . . . 202n may discontinue monitoring for local faults when a fault is detected so that the fault can be isolated and addressed without cascading to dependent faults (e.g., faults in dependent subsystems).

The master power sequencer 204 may transition the power state of the system 200 in response to the status bus 218 indicating that the slave power sequencers 202a . . . 202n have completed performance of the power sequencing protocol or transition to a fault state in response to a fault indication on the fault bus 220. In an example, the master power sequencer 204 may transition to a fault state in response to a failure of a power sequence state of the power sequencing protocol failing to complete within a predetermined time period, with or without an explicit fault indication on the fault bus 220. In an example, the master power sequencer may power down the system 200 in response to a fault or a failure of the power sequencing protocol to complete within a predetermined time period or provide some indication for a user to determine whether to take action on the fault or power sequencing failure. In some of these examples, the watchdog timer 239 may be set for the predetermined time period.

By configuring the slave power sequencers 202a . . . 202n to power sequence the at least one of the power groups 210, 212 through at least one power sequence state of a power sequencing protocol in response to shared commands on the shared command bus 216, the master power sequencer 204 may be agnostic of the quantity of voltage regulator modules 206, 208 and power groups 210, 212 controlled by the individual slave power sequencers and the enable/disable power sequencing timing requirements of the voltage regulator modules 206, 208 and power groups 210, 212. In this configuration, the system 200 is provided with an architecture in which additional slave power sequencers may be added to the system 200 without having to re-program or re-configure the master power sequencer 204. In an example, additional slave power sequencers may be added to the system 200 by coupling the additional slave power sequencers to the shared command bus 216, status bus 218, and fault bus 220.

Figure 3:
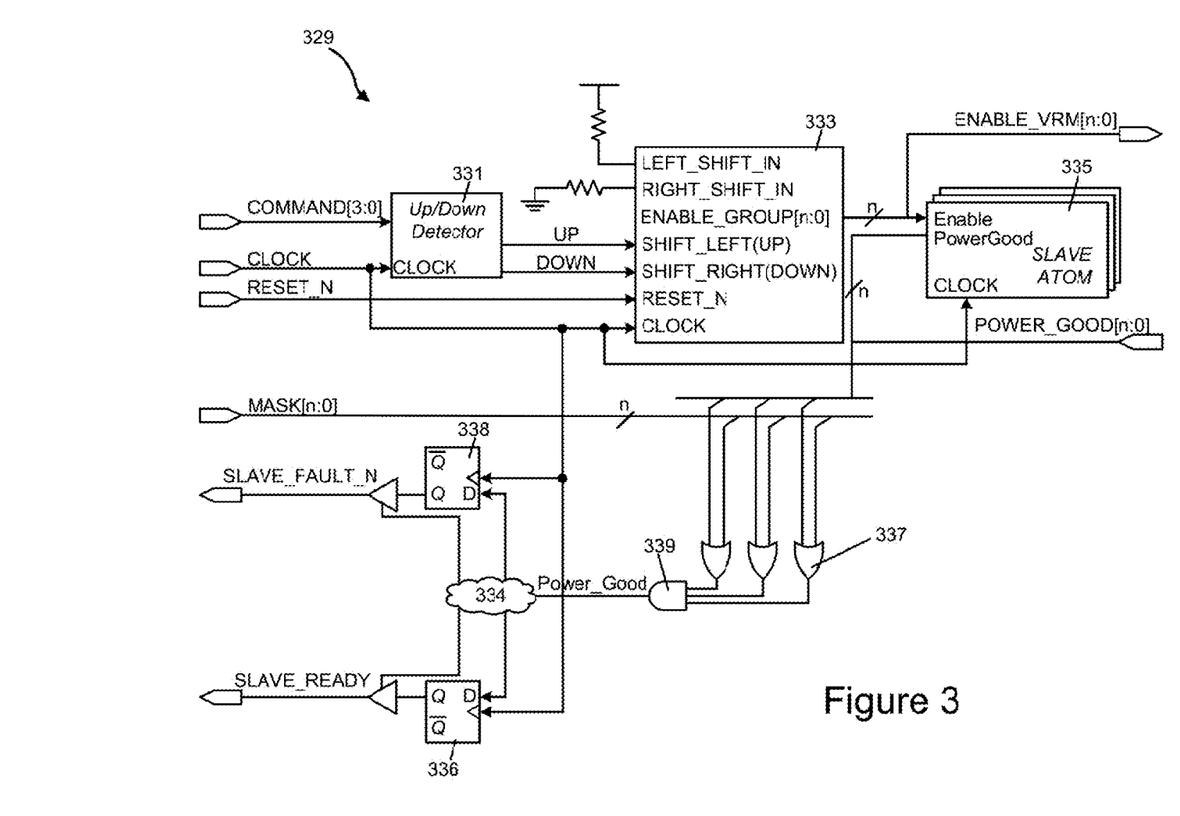
FIG. 3 is a block diagram of an example slave power sequencer, in accordance with various embodiments.

A more detailed view of an example controller 329 for a slave power sequencer is illustrated in FIG. 3. The controller 329 may comprise a state machine comprising an up/down detector 331 to detect whether a command (e.g., COMMAND[3:0]) on a command bus indicates an up power state or down power state, a shift register 333 to output enable/disable signals (e.g., ENABLE_VRM[n:0]) to the voltage regulator modules based on whether an up power state or down power state is detected by the up/down detector 331, and at least one slave atom 335 for fault detection/reporting and storing information regarding any cascading dependencies of the voltage regulator modules.

Figure 4:
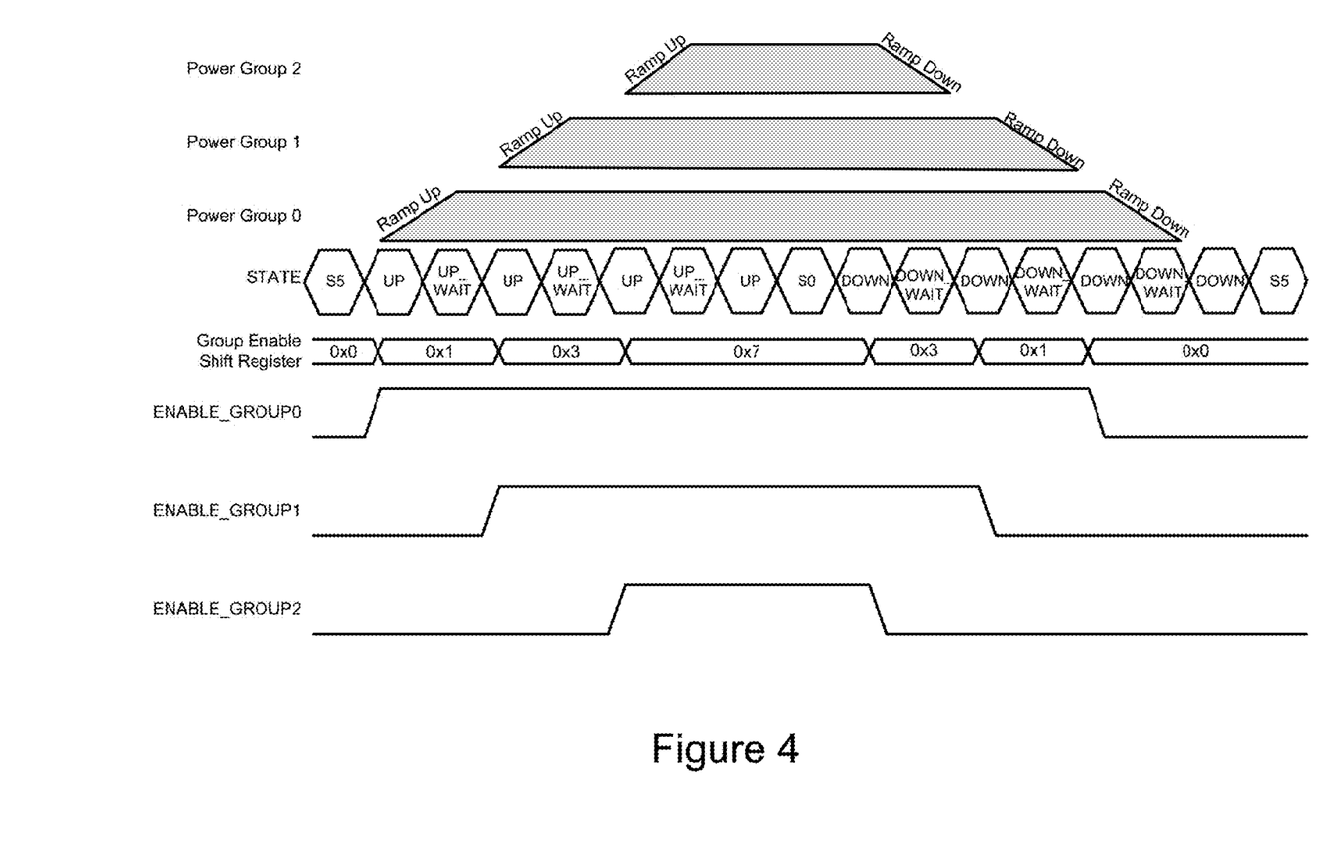
FIG. 4 illustrates an example power sequence, in accordance with various embodiments.

For an up power state command, the shift register 333 may shift left and shift in a "1", and for a down power state command, the shift register 333 may shift right and shift in an "0". FIG. 4 illustrates an example power-up/power-down sequence by a slave power sequencer. In this example, a shift event may occur only when an up or down state transition has been detected, and all slave power sequencers coupled to the shared command bus have the same number of shift register bits regardless of the number of power groups that the slave power sequencer actually controls so that all the slave power sequencers have their power groups synchronized/aligned with one another to ensure common voltages and sequencing are maintained.

The controller 329 may include logic 334 to determine whether a power good indication (e.g., POWER_GOOD) from the voltage regulator modules indicates that the power group has been successfully enabled or disabled, and flip-flops 336, 338 having clock input terminals coupled to the local clock and data terminals coupled to an output of the logic 334. The first flip-flop 336 may include an output terminal to output onto the status bus a status indication (e.g., SLAVE_READY) of the power sequencing of the voltage regulator modules, and the second flip-flop 338 may include an output terminal to output onto the fault bus a fault indication (e.g., SLAVE_FAULT_N).

The controller 329 may provide a mask for voltage regulator modules that may be ignored/masked. In some examples, the controller 329 may include an input to receive a mask indication (e.g., MASK[n:0] which in turn may input to logic 337 (e.g., OR gates) that mask any power good indications from the selected voltage regulator module. In some examples, a mask may be used when a voltage regulator module has been disabled or isolate (such as, e.g., in the case of a device being disabled for power savings or fault isolation) or for ignoring any voltage regulator modules that are not implemented. For example, a mask may be used in cases where fewer than all of the power groups are used. In this example, any power groups that are not implemented could be masked to indicate that the power group not present and to assume the power group is good. In various ones of these examples, the mask may allow for a common logic module for the entire slave infrastructure, passing in the appropriate mask setting to hide or de-feature the portions of logic that may not be in use.

Depending on the particular implementation of the logic 337, logic 339 (e.g., AND gate) may be provided for outputting a composite signal to the logic 334 for determining whether a power good indication (e.g., POWER_GOOD) from the voltage regulator modules indicates that the power group has been successfully enabled or disabled. In other examples, the controller 329 may omit masking logic 337, 339.

Figure 5:
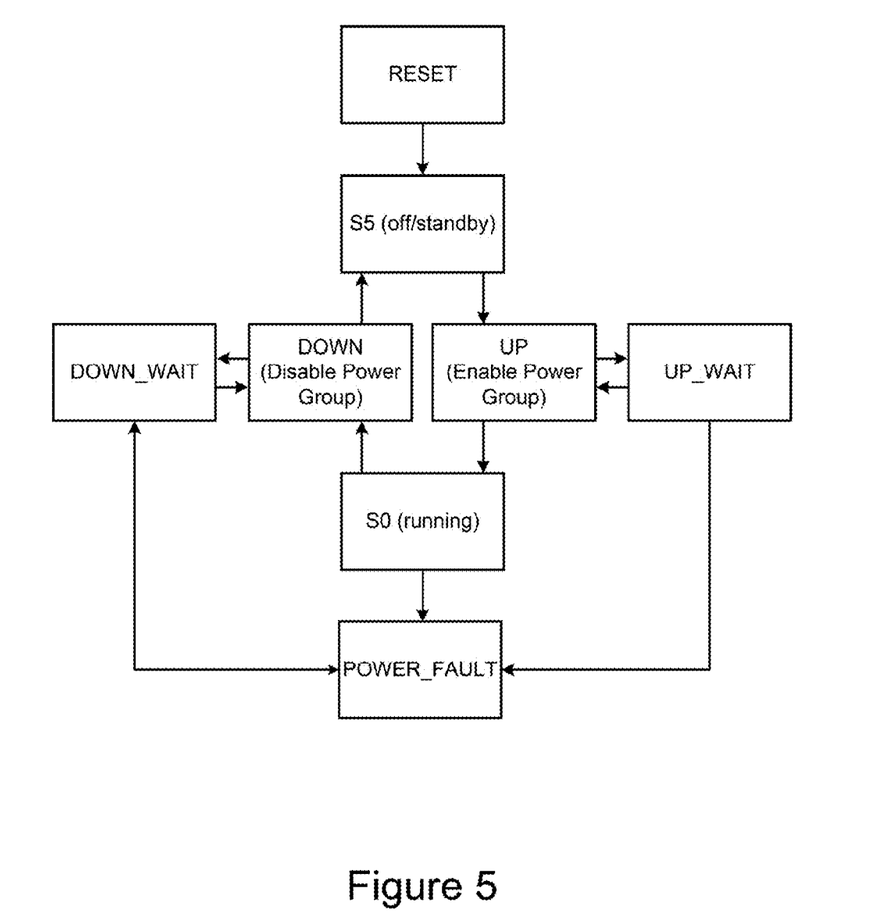
FIG. 5 illustrates an example state diagram for a master power sequencer, in accordance with various embodiments.

An example state diagram for the state machine of a master power sequencer (such as, e.g., state machine 230 as described herein with reference to FIG. 2) is illustrated in FIG. 5 and example timing diagrams for the transitions through the various states is illustrated in FIGS. 6-12. In some examples, the command bus may be implemented with n state bit pins. In other examples, the state bits may be encoded into a serial stream onto the command bus 216.

It is noted that although the various examples describe transitions between S0 and S5 states, examples are not limited to transitions between these two power states. It is contemplated that examples of the present disclosure are applicable to transitions between other power states. Systems within the scope of the present disclosure may include, for example, sleep states such as, for example, S1, S2, S3, and/or S4 states.

Figure 6:
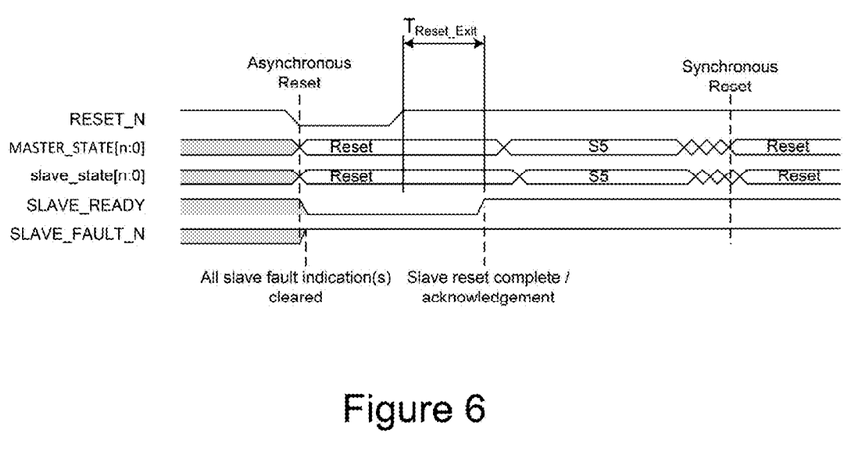
FIGS. 6-12 are example timing diagrams for various state change operations, in accordance with various embodiments.

As illustrated in FIG. 5 and FIG. 6, with continued reference to FIG. 2, the reset state may be initiated synchronously or asynchronously (e.g., RESET_N signal by a power requester) in response to which the master power sequencer 204 may drive the reset command onto the command bus 216. The controller 227 of the master power sequencer 204 and the controllers 229a . . . 229n of the slave power sequencers 202a . . . 202n may then enter the reset state (e.g., MASTER_STATE[n:0] and slave_state[n:0], respectively), and the slave power sequencers 202a . . . 202n may clear any fault indications (e.g., by releasing the SLAVE_FAULT_N signal). The slave power sequencers 202a . . . 202n may drive the status bus 218 low (e.g., SLAVE_READY signal) until the reset signal is released and the slave power sequencers 202a . . . 202n complete any initializations. When all the slave power sequencers 202a . . . 202n are ready, the controller 227 of the master power sequencer 204 may then enter the S5 (off/standby) power state. If, on the other hand, the slave power sequencers 202a . . . 202n are not ready after some predetermined time period elapses, the master power sequencer 204 may signal a fault, as described more fully elsewhere.

Figure 7:
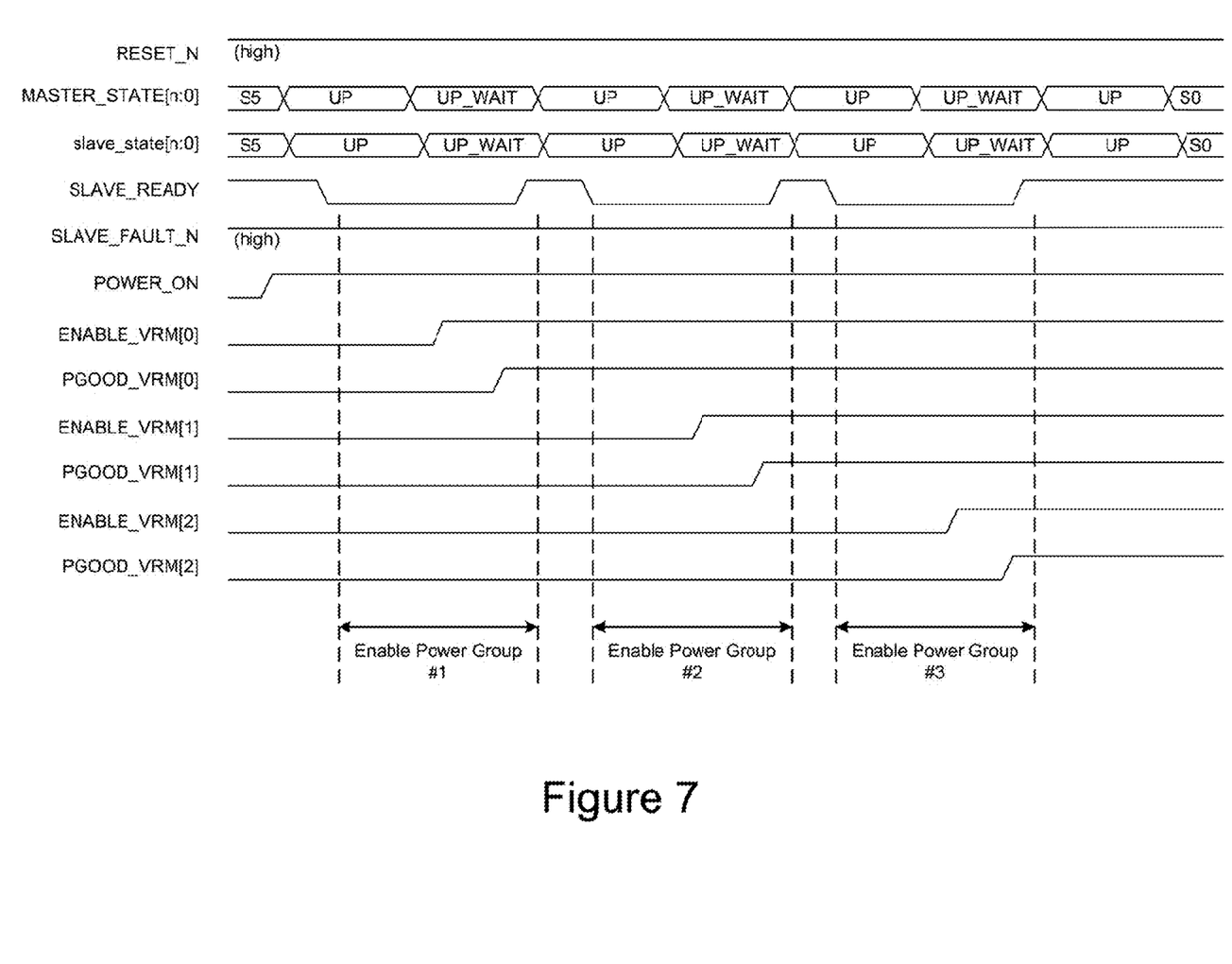

Transition from the S5 (off/standby) state to the S0 (running) state may be initiated by a request (e.g., POWER_ON signal) from a power requester, as illustrated in FIG. 7. In response, the controller 227 of the master power sequencer 204 transitions to an UP state (e.g., MASTER_STATE[n:0]), starts a watchdog timer, and drives the command onto the command bus 216, which in turn transitions the controllers 229a . . . 229n of the slave power sequencers 202a . . . 202n to the UP state (e.g., slave_state[n:0]). If any of the power groups remained to be powered up, the respective slave power sequencers 202a . . . 202n may drive the status bus 218 low (e.g., SLAVE_READY) to indicate that at least one of the power groups remain to be powered up. If the status bus 218 still indicates that at least one of the power groups remain to be powered up for the particular power sequence state on the expiration of the watchdog timer, the master power sequencer 204 may re-set the watchdog timer to increase the wait time and transition the state machine 230 of the controller 227 accordingly (e.g., UP_WAIT). The slave power sequencers 202a . . . 202n power sequence their respective voltage regulator modules (e.g., via ENABLE_VRM[x] signals, wherein x=the power group number) and receive power good signals back from the voltage regulator modules (e.g., via PGOOD_VRM[x] signals) if the respective power group(s) are powered up and in regulation.

The slave power sequencers 202a . . . 202n may then indicate on the shared status bus 218 that the next power group has been powered up (e.g., by tri-stating/releasing the SLAVE_READY_signal), in response to which the controller 227 of the master power sequencer 204 transitions to the UP state to check if additional power groups need to be enabled. If at least one of the power groups remain to be powered up, the slave power sequencers 202a . . . 202n may indicate so by driving the status bus 218 low (e.g., SLAVE_READY). If the status bus 218 indicates that at least one of the power groups remain to be powered up for the particular power sequence state on the expiration of the watchdog timer for the master power sequencer 204, the master power sequencer 204 may re-set the watchdog timer to increase the wait time and transition the controller 227 accordingly (e.g., UP_WAIT). The slave power sequencers 202*a* . . . 202*n* then transition to the next power sequence state to enable the next power groups. Once all power groups have been powered up, the slave power sequencers 202*a* . . . 202*n* may then indicate so on the status bus 218 (e.g., by tri-stating/releasing the SLAVE_READY signal). In some examples, the slave power sequencers 202*a* . . . 202*n* may enforce minimum PGOOD_VRM to SLAVE_READY timing to ensure that the voltage regulator modules are stable for a minimum amount of time before advancing to the next power enable sequence state.

Figure 8:
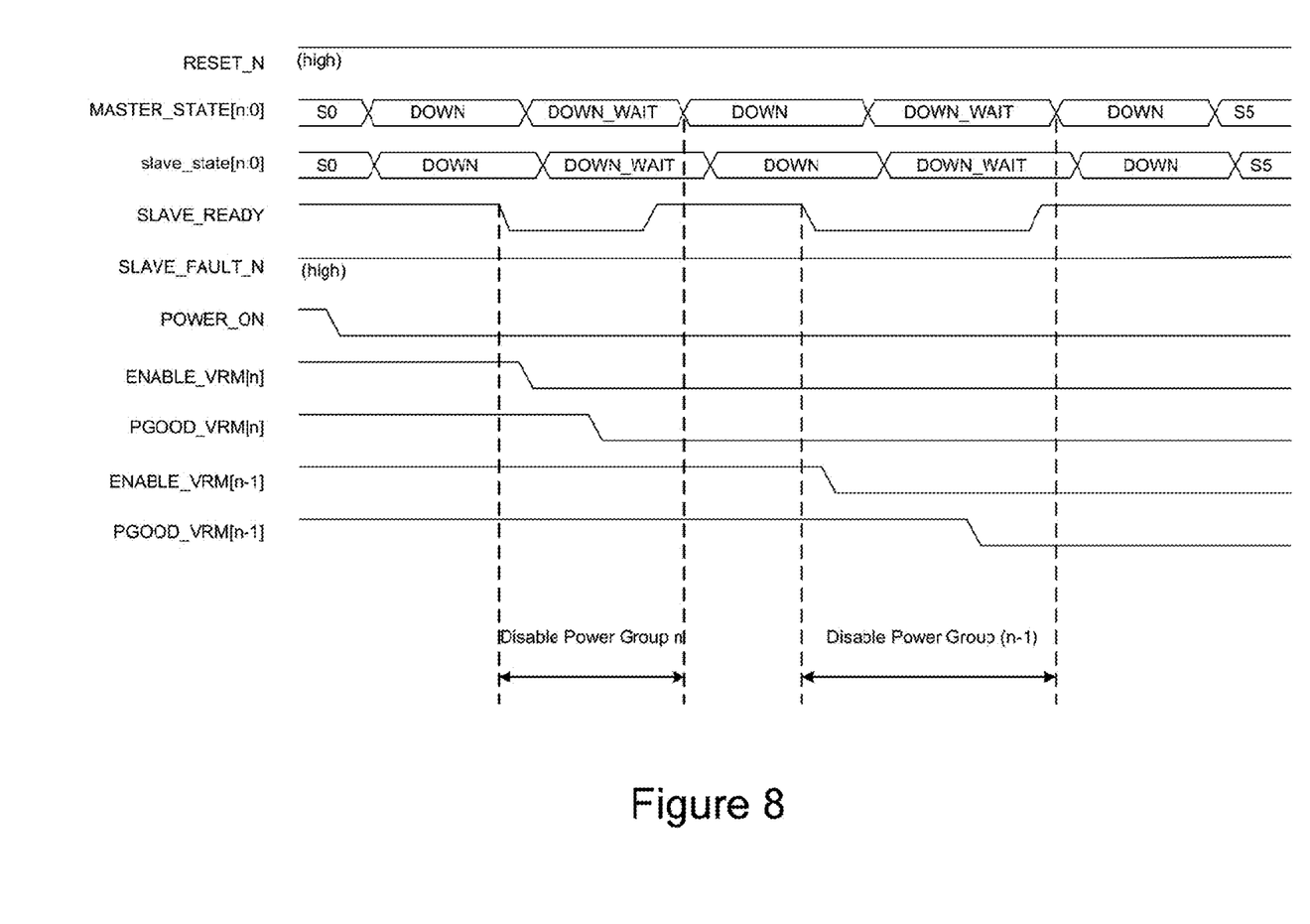

Transition from the S0 (running) state to the S5 (off/standby) state may be initiated by a request (e.g., POWER_ON signal low) from a power requester indicating a request to power down, as illustrated in FIG. 8. In response, the controller 227 of the master power sequencer 204 transitions to a DOWN state (e.g., MASTER_STATE[n:0]), starts a watchdog timer, and drives the command onto the command bus 216, which in turn transitions the controllers 229*a* . . . 229*n* of the slave power sequencers 202*a* . . . 202*n* to the DOWN state (e.g., slave_state[n:0]). If any of the power groups remained to be powered down, the respective slave power sequencers 202*a* . . . 202*n* may drive the status bus 218 low (e.g., SLAVE_READY) to indicate that at least one of the power groups remain to be powered down. If the status bus 218 still indicates that at least one of the power groups remain to be powered down for the particular power sequence state on the expiration of the watchdog timer, the master power sequencer 204 may re-set the watchdog timer to increase the wait time and transition the controller 227 accordingly (e.g., DOWN_WAIT). The slave power sequencers 202*a* . . . 202*n* power sequence their respective voltage regulator modules (e.g., via ENABLE_VRM[x] signals, wherein x=the power group number) and receive power good signals back from the voltage regulator modules (e.g., via PGOOD_VRM[x] signals) if the respective power group(s) are powered down and in regulation.

The slave power sequencers 202*a* . . . 202*n* may then indicate on the shared status bus 218 that the next power group has been powered down (e.g., by tri-stating/releasing the SLAVE_READY signal), in response to which the controller 227 of the master power sequencer 204 transitions back to the DOWN state to check if additional power groups need to be disabled/powered down. If at least one of the power groups remain to be powered down, the slave power sequencers 202*a* . . . 202*n* may indicate so by driving the status bus 218 low (e.g., SLAVE_READY). If the status bus 218 indicates that at least one of the power groups remain to be powered down for the particular power sequence state on the expiration of the watchdog timer for the master power sequencer 204, the master power sequencer 204 may re-set the watchdog timer to increase the wait time and transition the controller 227 accordingly (e.g., DOWN_WAIT). The slave power sequencers 202*a* . . . 202*n* then transition to the next power sequence state to disable the next power groups. Once all power groups have been powered down, the slave power sequencers 202*a* . . . 202*n* may then indicate so on the status bus 218 (e.g., by tri-stating/releasing the SLAVE_READYsignal). In some examples, the slave power sequencers 202*a* . . . 202*n* may enforce minimum PGOOD_VRM to SLAVE_READY timing to ensure that the voltage regulator modules have had an opportunity (e.g., enough time) for their output voltage/energy to dissipate sufficiently before advancing to the next power disable sequence state.

For transitions between power states, if the watchdog timer of the master power sequencer 204 times out without seeing an indication on the status bus 218 that the slave power sequencers 202*a* . . . 202*n* have enabled or disabled, respectively, their respective voltage regulator modules for the particular power sequence state, the master power sequencer 204 may transition to a fault state (e.g., POWER_FAULT), in accordance with the state diagram illustrated in FIG. 5. The master power sequencer 204 may then power down the power groups.

Figure 9:
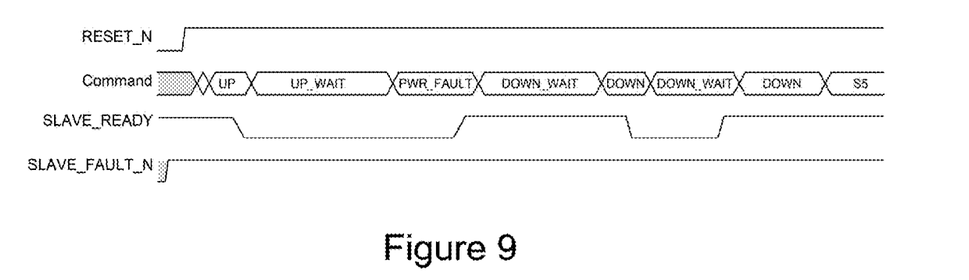
Figure 10:
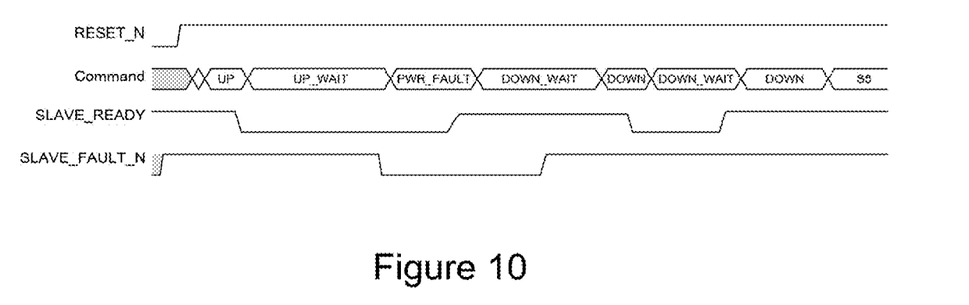

FIG. 9 and FIG. 10 are timing diagrams illustrating examples in which a fault is detected during power up. In FIG. 9, a slave power sequencer 202*a* . . . 202*n* may provide an indication on the status bus 218 (e.g., SLAVE_READY signal low) that a voltage regulator module has not powered up within an expected amount of time. In this example, the watchdog timer for the master power sequencer 204 expires because the master power sequencer 204 has not received an indication on that the status bus 218 that the voltage regulator module(s) are within regulation (e.g., "good"). The master power sequencer 204 may then transition to the power fault state on expiration of its watchdog timer (e.g., PWR_FAULT). In the power fault state, the slave power sequencers 202*a* . . . 202*n* may store fault information as a snapshot. In some examples, as illustrated in FIG. 9, the slave power sequencers 202*a* . . . 202*n* may indicate a non-fatal fault on the status bus 218 (e.g., by releasing the SLAVE_READY signal). A non-fatal fault may be, for example, a fault event in which the failing device can be isolated and the system repowered (e.g., brownout fault, overvoltage protection fault, undervoltage protection fault, etc.). The slave power sequencers 202*a* . . . 202*n* may then follow the down power sequence protocol through the transitions back to the off/standby power state S5.

In some examples, as illustrated in FIG. 10, the slave power sequencers 202*a* . . . 202*n* may indicate, during power up, a fatal fault on the fault bus 220 that may need immediate handling by the master power sequencer 204. In this example, the fatal fault is indicated by holding the fault signal (e.g., SLAVE_FAULT) low for a longer period of time than with a non-fatal fault in addition to the indication on the status bus 218 (e.g., by releasing the SLAVE_READY signal). In the illustrated example, the fatal fault is indicated on the fault bus 220 until the DOWN_WAIT state is observed on the command bus 216. A fatal fault may be, for example, a fault event in which system recovery may need an auxiliary power cycle or replacement of the failing device (e.g., branch circuit overload/overcurrent, fuse trip, etc.). In some examples, any slave power sequencers 202*a* . . . 202*n* controlling input power to the system (e.g., main e-fuse, power supplies) may turn the main power source off to prevent additional power in-rush to the system. The slave power sequencers 202*a* . . . 202*n* may then follow the down power sequence protocol through the transitions back to the off/standby power state S5.

Figure 11:
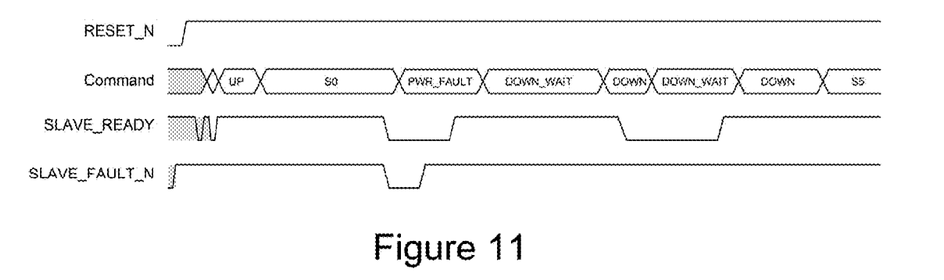
Figure 12:
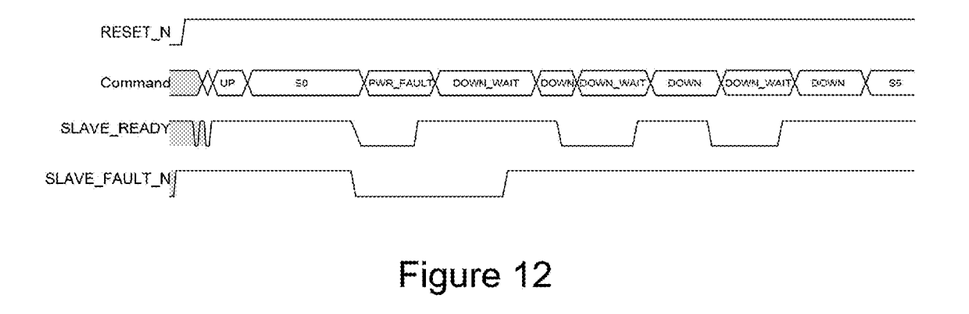

FIG. 11 and FIG. 12 are timing diagrams illustrating examples in which a fault is detected during run-time of the system. In FIG. 11, a slave power sequencer 202*a* . . . 202*n* may provide an indication on the status bus 218 (e.g., SLAVE_READY signal low) and on the fault bus 220 (e.g., SLAVE_FAULT_N signal low) that a power group is not in regulation, not stable, or is otherwise in fault. The master power sequencer 204 may then acknowledge the fault by transitioning to the power fault state (e.g., PWR_FAULT). In some examples, as illustrated in FIG. 11, the slave power sequencers 202*a* . . . 202*n* may indicate a non-fatal fault on the status bus 218 (e.g., by releasing the SLAVE_READY signal) and on the fault bus 220 (e.g., by releasing the SLAVE_FAULT_N signal) in response to which the master power sequencer 204 may transition to the DOWN_WAIT state. The slave power sequencers 202*a* . . . 202*n* may then follow the down power sequence protocol, as controlled/communicated by the master power sequencer 204, through the transitions back to the off/standby power state S5.

In various examples, if any of the slave power sequencers 202a . . . 202n detects a local fault (e.g., a fault local to the particular slave power sequencer), it may store the fault and drive out the fault indication on the fault bus 220. In this example, the slave power sequencers 202a . . . 202n may monitor the fault bus 220 for a fault indication of another one of the slave power sequencers 202a . . . 202n, and if a fault indication is detected, may discontinue monitoring for their own local faults (since a single fault has already been detected). The master power sequencer may then transition to the power fault state and then start to power the system down.

In some examples, as illustrated in FIG. 12, the slave power sequencers 202a . . . 202n may indicate a fatal fault during system run-time by holding the fault signal on the fault bus 220 low until the DOWN_WAIT state is observed on the command bus 216 rather than releasing the fault signal during the power fault state as done for indicating a non-fatal fault during run-time. In some examples, any slave power sequencers 202a . . . 202n controlling input power to the system (e.g., main e-fuse, power supplies) may turn the main power source off to prevent additional power in-rush to the system.

Although certain examples have been illustrated and described herein, it will be appreciated by those of ordinary skill in the art that a wide variety of alternate and/or equivalent examples or implementations calculated to achieve the same purposes may be substituted for the examples illustrated and described without departing from the scope of this disclosure. Those with skill in the art will readily appreciate that examples may be implemented in a wide variety of ways. This application is intended to cover any adaptations or variations of the examples discussed herein. It is manifestly intended, therefore, that examples be limited only by the claims and the equivalents thereof.

What is claimed is:

1. A system comprising:
a master power sequencer to output onto a command bus a command to perform a power sequencing protocol for transitioning the system from a first power state to a second power state, wherein the master power sequencer includes a master clock and a master synchronizer to synchronize master incoming signals to the master clock; and
a plurality of slave power sequencers sharing the command bus, each slave power sequencer to power sequence a respective power group to a next power sequence state in response to the command, wherein at least one slave power sequencer of the plurality of slave power sequencers includes a slave clock and a slave synchronizer to synchronize slave incoming signals to the slave clock, and wherein the master clock and the slave clock are independent from each other.

2. The system of claim 1, wherein the plurality of slave power sequencers are configured to output a status indication of the power sequencing of the respective power groups onto a status bus shared by the plurality of slave power sequencers.

3. The system of claim 2, wherein the master power sequencer is configured to repeat outputting the command until the status bus indicates that the plurality of slave power sequencers have completed power sequencing the respective power groups.

4. The system of claim 2, wherein the master power sequencer is configured to transition the system from the first power state to the second power state in response to the status bus indicating that the plurality of slave power sequencers have completed performance of the power sequencing protocol.

5. The system of claim 1, wherein the master power sequencer and at least one slave power sequencer of the plurality of slave power sequencers share a same clock.

6. The system of claim 1, wherein the master power sequencer interfaces between a system power requester and the plurality of slave power sequencers.

7. The system of claim 1, wherein the master power sequencer is agnostic of a quantity of power groups controlled by the plurality of slave power sequencers.

8. The system of claim 1, wherein the master power sequencer is agnostic of power sequencing timings for enabling and disabling voltage regulator modules controlled by the power groups.

9. The system of claim 1, wherein the plurality of slave power sequencers are configured to output onto a fault bus shared by the plurality of slave power sequencers, a fault indication indicating a failure to power sequence at least one of the respective power groups.

10. The system of claim 9, wherein the plurality of slave power sequencers are configured to monitor the fault bus for a fault indication and to discontinue monitoring for a local fault in response to the fault indication on the fault bus.

11. The system of claim 1, wherein the plurality of slave power sequencers are configured to determine whether a local fault is fatal or non-fatal and to output onto the fault bus an indication whether the local fault is fatal or non-fatal.

12. The system of claim 1, wherein the master power sequencer is configured to transition to a fault state or power down the system in response to a failure of the power sequencing protocol to complete within a predetermined time period.

13. The system of claim 12, wherein the master power sequencer includes a watchdog timer to expire at the predetermined time period, and wherein the master 83140317 19 power sequencer transitions to the fault state in response to the failure of the power sequencing protocol to complete before the watchdog timer expires.

14. An apparatus comprising:
a command bus and a status bus coupled to a plurality of slave power sequencers; and
a controller to output to the command bus a command to perform a power sequencing protocol for transitioning a system including the apparatus from a first power state to a second power state, and transition the system from the first power state to the second power state in response to the status bus indicating completed performance of the power sequencing protocol by the plurality of slave power sequencers, wherein the controller includes:
a state machine; and
a flip-flop including a clock input terminal coupled to the local clock, a data terminal coupled to an output of the state machine, and an output terminal coupled to the command bus for outputting the command to perform the power sequencing protocol.

15. The apparatus of claim 14, wherein the controller is a controller of a master power sequencer, the master power sequencer including a master clock and a master synchronizer to synchronize incoming signals to the master clock.

16. A system comprising:
a master power sequencer to output onto a command bus a command to perform a power sequencing protocol for transitioning the system from a first power state to a second power state; and
a plurality of slave power sequencers sharing the command bus, each slave power sequencer to power sequence a respective power group to a next power sequence state in response to the command, wherein the master power sequencer is agnostic of a quantity of power groups controlled by the plurality of slave power sequencers.

17. The system of claim 16 wherein the plurality of slave power sequencers are configured to output a status indication of the power sequencing of the respective power groups onto a status bus shared by the plurality of slave power sequencers.

18. The system of claim 17, wherein the master power sequencer is configured to repeat outputting the command until the status bus indicates that the plurality of slave power sequencers have completed power sequencing the respective power groups.

19. The system of claim 16, wherein each slave power sequencer power sequences a respective power group to a next power sequence state independently.

20. The system of claim 16, wherein the master power sequencer is configured to transition to a fault state or power down the system in response to a failure of the power sequencing protocol to complete within a predetermined time period.

* * * * *